United States Patent
Shin et al.

[11] Patent Number: 6,151,075
[45] Date of Patent: Nov. 21, 2000

[54] DEVICE AND METHOD FOR CONVERTING FRAME RATE

[75] Inventors: Hyun Joong Shin, Seoul; Hyung Mo Park, Inchon-Kwangyoksi, both of Rep. of Korea

[73] Assignee: LG Electronics Inc., Seoul, Rep. of Korea

[21] Appl. No.: 09/093,864

[22] Filed: Jun. 9, 1998

[30] Foreign Application Priority Data

Jun. 11, 1997 [KR] Rep. of Korea .................. 97 24172
Dec. 12, 1997 [KR] Rep. of Korea .................. 97 68276

[51] Int. Cl.[7] .................................................. H04N 7/01
[52] U.S. Cl. .................... 348/459; 348/441; 348/415; 348/416
[58] Field of Search ............................ 348/459, 441, 348/443, 445, 446, 448, 449, 451, 452, 558, 413, 416, 845, 96, 97, 911, 415; H04N 7/01

[56] References Cited

U.S. PATENT DOCUMENTS

| | | | |
|---|---|---|---|
| 5,485,216 | 1/1996 | Lee ........................... | 348/443 |
| 5,508,747 | 4/1996 | Lee ........................... | 348/441 |
| 5,734,420 | 3/1998 | Lee et al. .................. | 348/441 |
| 5,754,248 | 5/1998 | Faroudja .................... | 348/474 |
| 5,757,967 | 5/1998 | Gonzales et al. .......... | 382/233 |
| 5,768,469 | 6/1998 | Yagasaki et al. .......... | 386/109 |
| 5,999,220 | 12/1999 | Washino ..................... | 348/441 |

*Primary Examiner*—Michael Lee
*Attorney, Agent, or Firm*—Fleshner & Kim, LLP

[57] ABSTRACT

Device and method for converting a frame rate, is disclosed, in which a motion compensated frame is newly produced in converting a frame rate, particularly, in a digital TV of a PAL or NTSC system, a motion component compensated separate frame is provided between frames and displayed to horizontal/vertical synchronizing signals two times faster than an original frequency for eliminating flicker, and in a case when a video signal of a film rate is converted into a video signal of a frame rate of PAL or NTSC system, motion component compensated new frames are produced for converting the frame rate for preventing blurring occurred in motion portions. And, by differently compensating motion components of N frames inserted between two frames and processing the frames in real time, a slow motion can be displayed smoothly without any separate memory.

22 Claims, 8 Drawing Sheets

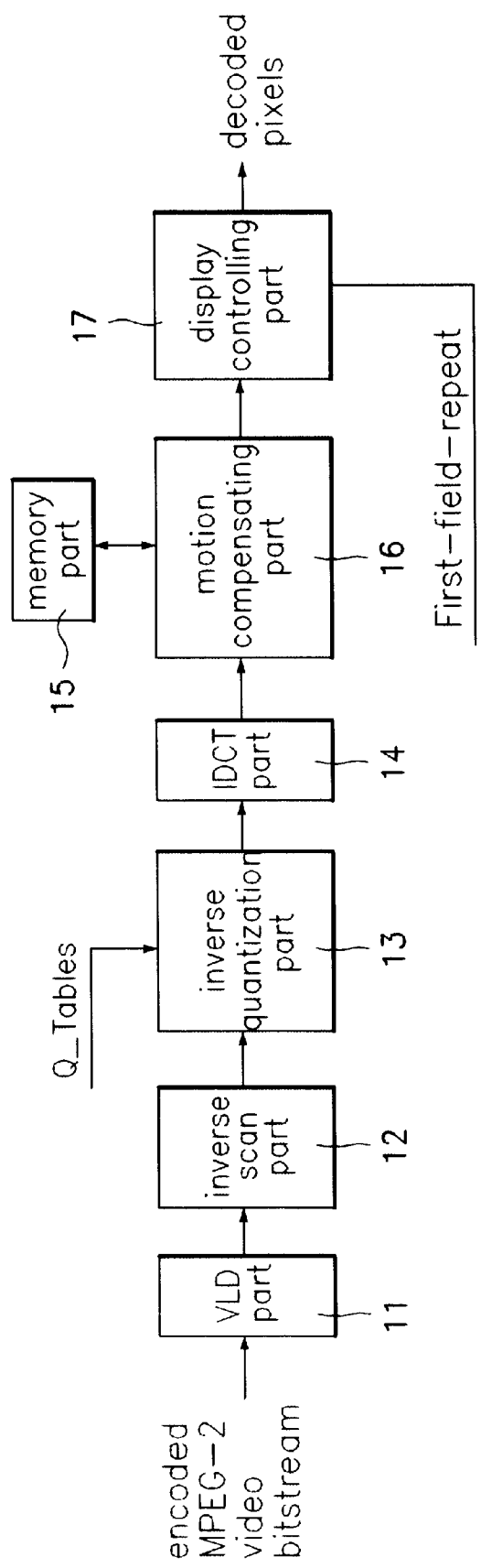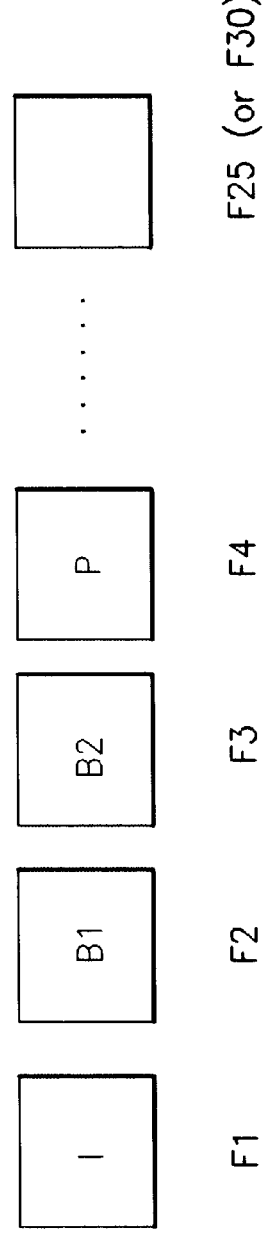

DEVICE AND METHOD FOR CONVERTING FRAME RATE

BACKGROUND OF THE INVENTION

1. Field of the Invention

The present invention relates to a video compression system, and more particularly, to device and method for converting a frame rate, in which a motion compensated frame is newly produced and applied to a required place for converting a frame rate.

2. Description of the Related Art

Up to now, application of the digital video compression has been restricted to communication media and storage media due to a capacity limitation of the media. However, as the MPEG-2 in which standardizations directed to a high quality broadcasting are push forwarded is employed as a new broadcasting system since it can realize a high picture quality and a high compression ratio, the MPEG-2 (Motion Picture Expert Group) became a motive power for exploring a new era of broadcasting. In connection with this, with a device employing an MPEG-2 decoder are applied to TV, until now, a broadcasting signal is merely digitized, compressed, and transmitted/received through a satellite, cable, or as a terrestrial wave, without deviating the broadcasting signal itself from the present TV system of NTSC, PAL, or SECAM. In other words, without converting the broadcasting signal itself, the MPEG-2 decoder converts a frame rate of the digitized, compressed and encoded signal of a motion picture so as to be in conformity with an existing TV broadcasting signal. For example, in the case of an NTSC system, the present TV broadcasting system has a frame rate of 30 frames per a second, and in the case of a PAL system, the present TV broadcasting system has a frame rate of 25 frames per a second, regardless of a frame rate of an incoming source signal, for being displayed on a screen.

FIG. 1 illustrates a block diagram of a background art device for decoding an MPEG-2 video signal, provided with a VLD(Variable Length Decoding) part 11 for receiving and subjecting an MPEG-2 video bitstream to variable length decoding to provide original serial data of a zigzag scanned 8×8 matrix, an inverse scan part 12 for converting the serial data from the VLD part 11 into a two dimensional data array of 8×8 matrix, an inverse quantization part 13 for using a Q_table in subjecting the two dimensional data array of 8×8 matrix from the inverse scan part 12 to inverse quantization, an IDCT(Inverse Discrete Cosine Transform) part 14 for subjecting the inverse quantized data in the inverse quantization part 13 to inverse DCT, a memory part 15 for storage of prior pictures, a motion compensating part 16 for using the prior picture stored in the memory 15 and a motion vector of a presently received picture in reproducing a picture from the IDCT part 14 into original extended series of pictures if the picture from the IDCT part 14 is either a B(Bidirectional) picture or a P (Predictive) picture, and a display controlling part 17 for presenting a motion compensated data after rearrangement or as they are depending on a picture type. Being a value used in determination of a quantizing step in an encoding in a transmitter side, the Q_table provided to the inverse quantization part 13 comes from the transmitter side.

FIG. 2 illustrates a regular frame rate by an MPEG-2 video decoder processing in a case when a number of B pictures is two in FIG. 1.

In the aforementioned background art device for decoding an MPEG video signal, upon reception of an encoded MPEG-2 video bitstream from the transmitter side, the VLD part 11 turns the encoded MPEG-2 video bitstream back to original horizontal/vertical frequency bands. That is, the received MPEG-2 video bitstream, being variable length encoded by zigzag scanning, exists in series. Accordingly, the VLD part 11 turns the variable length encoded values by zigzag scanning back to original one dimensional DCT coefficients. The one dimensional DCT coefficients turned back to original state is provided to the inverse scan part 12 and converted into DCT coefficients of a 8×8 matrix. The inverse quantization part 13 uses a Q-table used in the encoding in subjecting block units of DCT coefficients converted into a two dimensional data array of 8×8 matrix received from the inverse scan part 12 to inverse quantizing and provides to the IDCT part 14. Having its energy components compressed already to be concentrated on a low frequency side, with almost all high frequency components converted into 0, values provided to the IDCT part 14 are restored through the IDCT part 14. If data restored through the IDCT part 14 is an I picture, the I picture is a perfect one that can be displayed as it is, and data restored through the IDCT part 14 is a B or P picture, the picture is an imperfect picture that can be displayed through the motion compensating part 16. That is, with reference to the I picture, a motion vector, information representing a motion, may be considered as "0", which need not any motion compensation, and B or P picture can be motion compensated and restored to an original picture using a prior picture stored in the memory part 15. The motion vector MV is a two dimensional vector indicating an offset of a coordinate of a field in a prior frame from a coordinate of the present picture or field for use in a motion compensation. For an motion prediction in an encoder, first of all, the motion vector MV should be obtained. Because one macroblock may have four motion vectors at the maximum, of which bit amount is too voluminous to pass as they are, a difference of motion vectors of the present macroblock from a right prior macroblock is variable length encoded for transmission. The motion compensating part 16, provided for restoring B or P picture obtained through a prediction, uses a prior picture stored in the memory part 15 and a motion vector on the present B or P picture from the IDCT 14 in making an one directional or bidirectional prediction of the B or P picture for reproducing a perfect image of the B or P picture. If a number of the B pictures is two, the MPEG-2 picture may have a sequence of IBBPBBP - - - , of which B pictures can be decoded only when P or I picture which comes later in terms of time should be used. It implies that a decoding should be carried out in a sequence of IPBBPBB - - - while a display should be carried out in another sequence of IBBPBBP - - - . Accordingly, the display controlling part 17 presents pictures either after rearranging the pictures or as they are depending on a picture type. If the number of the B pictures is two, a series of frames provided from the display controlling part 17, being I, B1, B2, P, - - - as shown in FIG. 2, are displayed on the screen with a frame rate of F25(PAL) or F30(NTSC) when the frame rate is regular. That is, the NTSC system has a frame rate of 30 frames per a second and the PAL system has a frame rate of 25 frames per a second. Accordingly, a film rate(24 frames per a second) in which a signal is processed in a film mode of a digital TV standard (MPEG-2) should be converted into an existing NTSC or PAL system. To do this, if a video signal is received in the film rate, the video signal is inserted appropriately and repeatedly into a whole video sequence in field units, so that the whole video sequence has an intended frame rate. In this instance, the MPEG video signal thus obtained by repetition has a separate syntax which can indicate to the MPEG-2 decoder for easy display of the video signal in conformity with the repeated signal. That is, if a frame rate conversion indicative signal first_field_repeat provided to the display controlling part 17 is enabled, the display controlling part 17 controls a video signal received at the present time to be displayed repeatedly.

FIG. 3 illustrates a frame rate conversion of digital video signal from 24 to 30.

Each of received frames F1, F2, F3, F4, - - -, F24 is divided into a top field f1 and a bottom field f2, and a new decoded frame F1, F2, F3', F4', - - -, F30 is produced from the divided top fields f1 and the bottom fields f2, i.e., a new frame is produced from adjacent two frames which are the most closely related. That is, a new decoded frame F3' is produced from the top field f1 of the frame F2 and the bottom field f2 of the frame F3, i.e., $$F3' = \frac{f1 \text{ of } F2 + f2 \text{ of } F3}{2}$$

and another new frame F4' is produced from the top field f1 of the frame F3 and the bottom field f2 of the next frame F4. By repeating production of new frames from the most closely related adjacent frames, the frame rate conversion from 24 to 30 is done.

However, the aforementioned frame rate conversion of alternating repetition of fields has a problem of blurring of motion components in which motion portions of an image become not clear caused by mere repetition of the fields.

And, of the flicker of pictures due to 25 or 30 frame rate display of one image of the MPEG-2 decoder, though the flicker in the case of NTSC system of 30 frame rate causes no significant problem, the flicker in the case of PAL system of 25 frame rate causes a significant problem.

Also, in the case of slow motion, the mere repetitive memorization and display of fields or frames results in the slow motion not smooth, with a requirement for an additional memory.

SUMMARY OF THE INVENTION

Accordingly, the present invention is directed to device and method for converting a frame rate that substantially obviates one or more of the problems due to limitations and disadvantages of the related art.

An object of the present invention is to provide device and method for converting a frame rate which can modify motion components of a frame produced additionally.

Another object of the present invention is to provide device and method for converting a frame rate which can eliminate flicker of images.

Further object of the present invention is to provide device and method for converting a frame rate which can prevent blurring of motion components.

Still further object of the present invention is to provide device and method for converting a frame rate which can make a slow motion smooth.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for converting a frame rate includes a motion vector producing part for producing a new motion vector using the motion vector transmitted from a transmitter side, a frame producing part for applying the motion vector newly produced in the motion vector producing part to the field or frame for producing a new field or frame, and display part for adding the new frame having a motion component compensated in the frame producing part to the MPEG decoded frame.

The display part adds the new frame having a motion component compensated in the frame producing part between every adjacent frames in a series of the MPEG decoded frames and displaying on a screen at a clock frequency of two times.

The display part adds the new frame having a motion component compensated in the frame producing part between preset frames only in a series of the MPEG decoded frames and displaying on a screen at a regular clock frequency.

The display part adds N new frames produced additionally in the frame producing part between frames in a series of the MPEG decoded frames and displaying on a screen at a regular clock frequency.

The motion vector producing part averages adjacent two motion vectors for obtaining a new motion vector.

The motion vector producing part weights respective motion vectors in calculating a new motion vector.

In other aspect of the present invention, there is provided a device for converting a frame rate, including a motion vector reproducing part for using a motion vector transmitted from a transmitter side in producing a new motion vector and multiplexing the new motion vector with existing motion vectors in terms of time, a motion compensating and frame producing part for applying the motion vector from the motion vector reproducing part to prior pictures stored in the frame memory respectively and adding to the IDCT data respectively, and an FIFO memory for writing the data from the motion compensating and frame producing part at a regular clock frequency, reading at a clock frequency two times faster and forwarding to the display controlling part.

In another aspect of the present invention, there is provided a device for converting a frame rate including a video signal determining part for determining whether the MPEG decoded signal is an original broadcasting signal or the film mode signal according to a digital TV signal standard from information encoded in the MPEG decoded video signal, a motion vector reconciling part for calculating a new motion vector using the MPEG decoded motion vector if the MPEG decoded signal is determined to be the film mode signal in the video signal determining part, a frame compensating part for applying the motion vector reconciled in the motion vector reconciling part to the frame from the video signal determining part for producing a motion compensated new frame in conversion of a frame rate, and a buffer for temporary storage of the video signal from the frame compensating part or the video signal determining part.

In further aspect of the present invention, there is provided a method for converting a frame rate including (1) a motion vector producing step for producing a new motion vector using a motion vector transmitted from a transmitter side, (2) a frame producing step for applying the new motion vector produced in the (1) motion vector producing step to the field or frame for producing a motion component compensated new field or frame, and (3) a display step for adding the motion component compensated new frame in the (2) frame producing step to the MPEG decoded frame for display on a screen in a converted frame rate.

The (3) display step includes the steps of adding the new frame having motion components compensated in the (2) frame producing step between every adjacent frames in a series of the MPEG decoded frames, and displaying at two times of clock frequency.

The (3) display step includes the steps of adding the new frame having motion components compensated in the (2) frame producing step between preset frames only in a series of the MPEG decoded frames, and displaying at a regular clock frequency.

The (3) display step includes the steps of producing a motion component compensated new field from fields of related adjacent frames, and producing a motion component compensated new frame from the produced new field and a remaining field of the present frame.

The (3) display step includes the steps of adding N(N is a natural number) new frames produced additionally in the (2) frame producing step between frames in a series of the MPEG decoded frames, and displaying at a regular clock frequency.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 illustrates a block diagram of a background art device for decoding an MPEG-2 video signal;

FIG. 2 illustrates a regular frame rate of a PAL system in a case when a number of B pictures in FIG. 1 is two;

DETAILED DESCRIPTION OF THE PREFERRED EMBODIMENT

Figure 3:
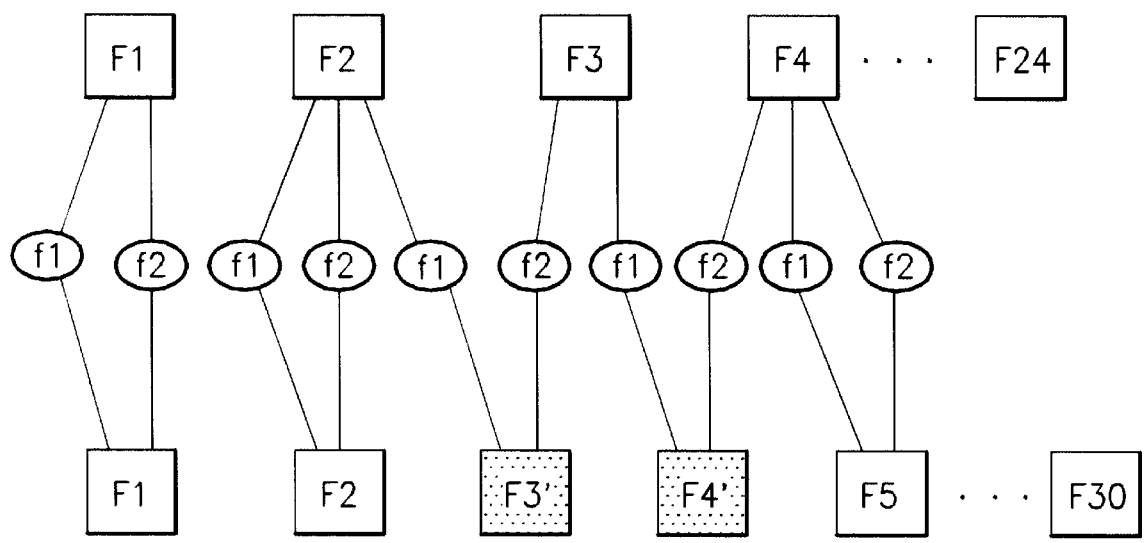
FIG. 3 illustrates a frame rate conversion in the device shown in FIG. 1.
Figure 4:
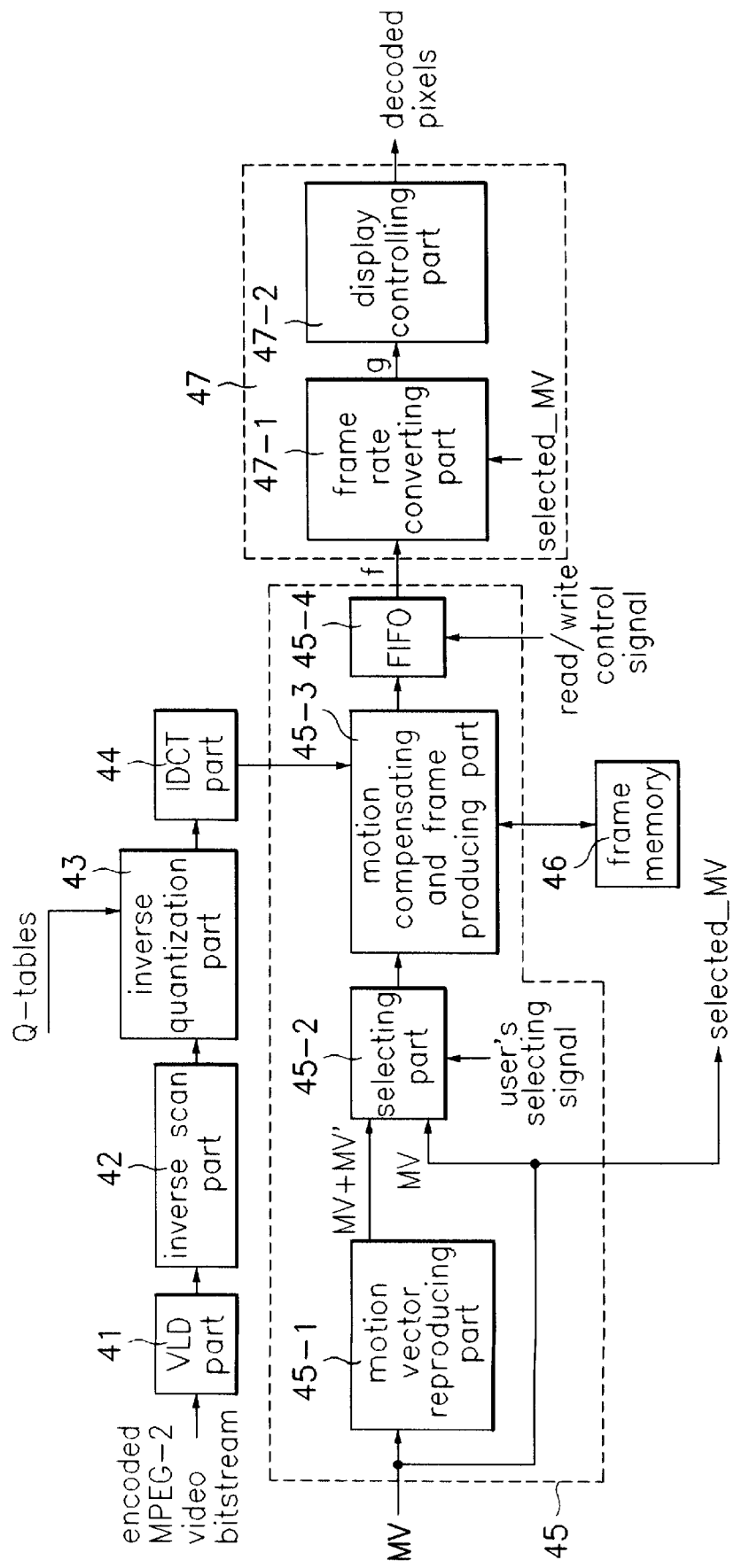
FIG. 4 illustrates a block diagram of a device for decoding an MPEG-2 video signal in accordance with a preferred embodiment of the present invention.
Figure 5:
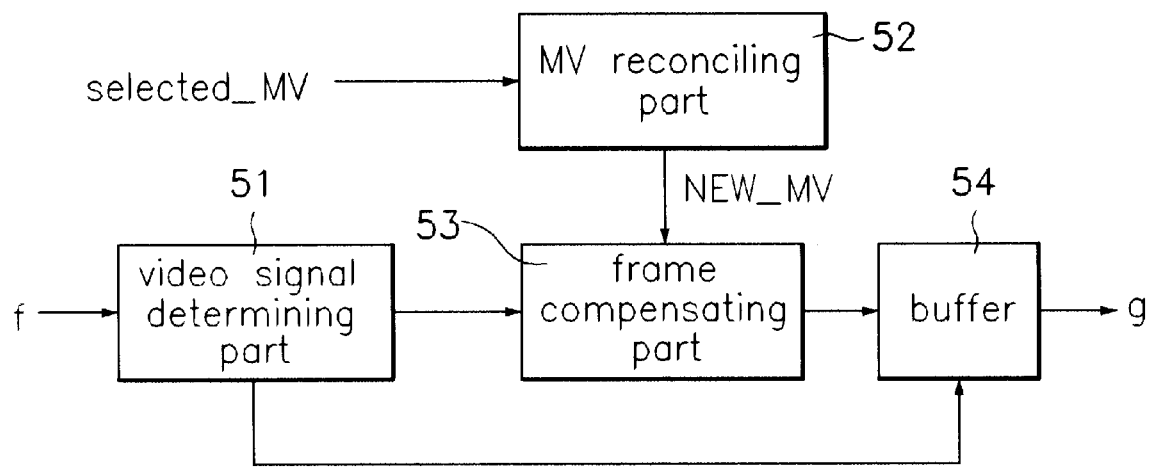
FIG. 5 illustrates a detailed block diagram of the frame rate converting part shown in FIG. 4.

Reference will now be made in detail to the preferred embodiments of the present invention, examples of which are illustrated in the accompanying drawings. FIG. 4 illustrates a block diagram of a device for decoding an MPEG-2 video signal in accordance with a preferred embodiment of the present invention.

Referring to FIG. 4, the device for decoding an MPEG-2 video signal in accordance with a preferred embodiment of the present invention includes a VLD part 41 for receiving and subjecting a video bitstream to variable length decoding to provide one dimensional DCT coefficients, an inverse scan part 42 for converting the one dimensional DCT coefficients from the VLD part 41 into a two dimensional DCT coefficient array of a 8×8 matrix, an inverse quantization part 43 for subjecting the two dimensional DCT coefficient array of a 8×8 matrix from the inverse scan part 42 to inverse quantization according to a Q table used in encoding, an IDCT part 44 for subjecting the inverse quantized data in the inverse quantization part 43 to inverse DCT, a frame memory 46 in storage of prior pictures, a motion vector reproducing part 45-1 for receiving a motion vector MV, producing a new motion vector MV' between frames from the received motion vector MV, and multiplexing the new motion vector MV' with the original motion vector MV in view of time, a selecting part 45-2 for selecting either the received motion vector MV or the motion vectors MV+MV' from the motion vector reproducing part 45-1, a motion compensating and frame producing part 45-3 for restoring an original picture before compression by making a motion compensation of a picture using a prior picture stored in the frame memory 46 and the motion vector from the selecting part 45-2 and adding the motion compensated picture to an output of the IDCT part 44, a FIFO(First-In First-Out) memory 45-4 for reading after writing an output of the motion compensating and frame producing part 45-3 in response to read/write signals, and a display part 47 for producing a new frame using a new motion vector in a case an output of the FIFO 45-4 is of a film rate in converting the film rate to a frame rate of an NTSC or PAL system. The motion vector reproducing part 45-1, the selecting part 45-2, the motion compensating and frame producing part 45-3 and the FIFO 45-4 compose a motion compensating circuit. The display part 47 includes a frame rate converting part 47-1 for determining whether a picture data from the motion compensating circuit is a broadcasting signal originally or a film signal and producing a new frame using a motion vector Select_MV from the motion compensating circuit if determined to be a film signal in converting a frame rate, and a display controlling part 47-2 for displaying a picture data from the frame rate converting part 47-1 on a screen. The frame rate converting part 47-1 includes a video signal determining part 51 for using the frame rate conversion indicating signal First_field_repeat encoded in a decoded video data f in determining whether a received data is the broadcasting signal originally or the film signal to determine conversion of a frame rate, a motion vector reconciling part 52 for re-calculating a new motion vector NEW_MV for a frame or field using a motion vector selected_MV from the motion compensating circuit, a frame compensating part 53 for using the newly reconciled motion vector NEW_MV for a field or frame from the video signal determining part 51 in producing a new field or frame, and a buffer 54 for temporary storage of a video data having a frame rate converted in the frame compensating part 53 or a video data on the original broadcasting signal not passed through frame rate conversion in the video signal determining part 51 and providing to the display controlling part 47-2.

In the aforementioned preferred embodiment of the present invention, the VLD part 41 receives an MPEG-2 video bitstream variable length encoded by zigzag scan to exist in series and subjects the MPEG-2 video bitstream to variable length decoding to convert the MPEG-2 video bitstream into original one dimensional DCT coefficients. The one dimensional DCT coefficients restored into an original state is provided to the inverse scan part 42, converted into a two dimensional DCT coefficient array of 8×8 matrix, and provided to the inverse quantization part 43. The inverse quantization part 43 subjects 8×8 matrix block units of DCT coefficients to inverse quantization according to a quantizing table value Q_tables and provides to the IDCT part 44. Because energy components of the DCT coefficients are already compressed, with the DCT coefficients concentrated on a low frequency side and almost all high frequency components converted into "0", the inverse quantized DCT coefficients provided to the IDCT part 44 are restored by the IDCT part 44. If the data restored by the IDCT part 44 is an I picture, the data is a perfect picture that can be displayed as it is, and if a B or P picture, the data is an imperfect picture that can be displayed through the motion compensating circuit 45. Accordingly, if the picture from the IDCT part 44 is an I picture, the picture is directly stored in the frame memory 46 as a prior picture without any motion compensation in the motion compensating and frame producing part 45-3 in the motion compensating circuit, and if B or P picture, the picture is stored in the frame memory 46 as a prior picture after being motion compensated thereby being restored into a perfect picture in the motion compensating and frame producing part 45-3. An output of the motion compensating and frame producing part 45-3 is also written on the FIFO memory 45-4.

In the meantime, the motion vector reproducing part 45-1 receives a motion vector, obtains a new motion vector MV' using the received motion vector MV, adds to the original motion vector MV with respect to a time MV+MV', and provides to the selecting part 45-2. The new motion vector MV' is produced for using in production of an additional frame to be inserted between existing frames. That is, since the motion vector MV provided to the motion vector reproducing part 45-1 is encoded in a macroblock in each picture of an MPEG video bitstream, the motion vector MV can be decoded. As a P-picture has one motion vector encoded in each macroblock and a B-picture has two motion vectors encoded in each macroblock, a field or frame may be restored using this. And, because the new motion vector MV' obtained in the motion vector reproducing part 45-1 is inserted between every original motion vectors MV, once motion compensation is conducted in the motion compensating part 45-3 applying such motion vectors to received frames, two times of frames are provided. One embodiment of a method for obtaining the new motion vector can be expressed in the following equation (1).

$$MVn' = \frac{MVn + MVk}{2} \quad (1)$$

Where "n" and "k" each denotes a frame number, MVn' denotes a new vector between nth and kth vectors. That is, original motion vectors MV of adjacent frames are added then divided by two to obtain a new motion vector MV'. Setting of selection of the selecting part 45-2 may be done either by a user or at shipment to an arbitrary condition, whether two times of motion vectors MV+MV' or motion vectors MVs of the original frame rate are provided to the motion compensating part 45-3. If the selecting part 45-2 selects the motion vectors MVs of the original frame rate, which is identical to the background art, and if the IDCT part 44 provides B or I picture, the motion compensating and frame producing part 45-3 uses received motion vectors MV and prior pictures stored in the frame memory 46 in making bidirectional or one directional prediction in conducting motion compensation and adds to an output of the IDCT part 44, to restore into the original picture before compression. The FIFO memory 45-4 writes an output of the motion compensating and frame producing part 45-3 thereon according to a write clock and reads data in the order of reception according to a read clock, in which clock frequencies of the data written on or read from the FIFO memory 45-4 are the same.

Figure 6:
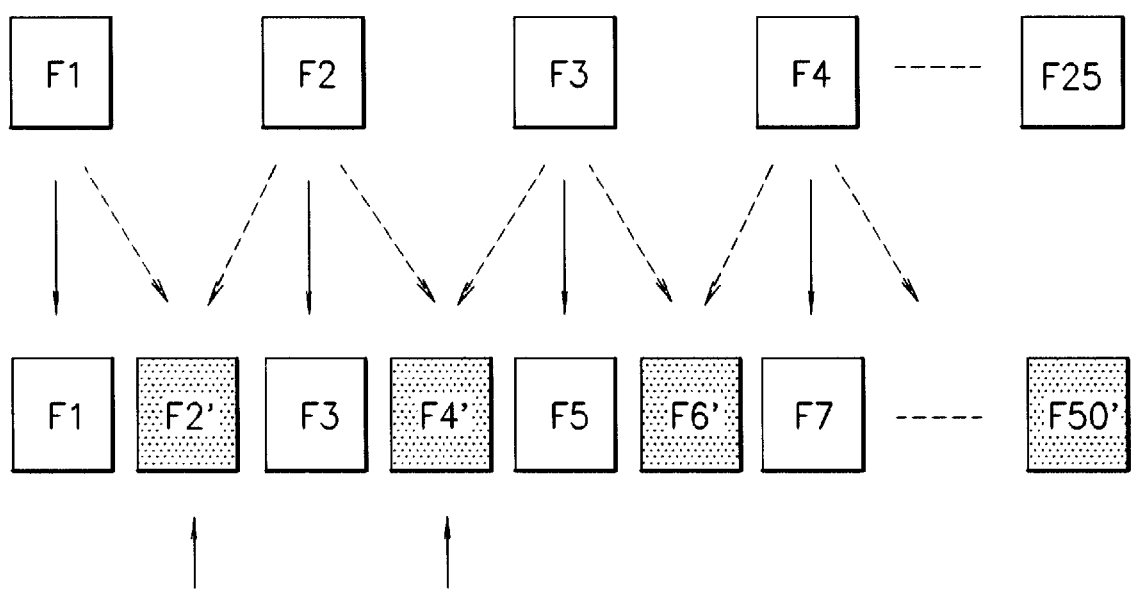
FIG. 6 illustrates a system of frames provided for eliminating flickers in the device shown in FIG. 4; and, FIGS. 7 to 9 illustrate embodiments of frame rate conversion processes in accordance with the present invention.

In the meantime, if the selecting part 45-2 selects the two times of vectors MV+MV', in which a number of motion vectors applicable to one picture is two, the motion compensating and frame producing part 45-3 makes a motion compensation for a picture both with the MV once and with the MV' once and provides a two times motion compensated picture to the FIFO memory 45-4. That is, if a datastream received originally is I, B, B, P, B, B, P, B, - - -, I, a datastream from the FIFO memory 45-4 is I1, I2, B1, B2, B1, B2, P1, P2, B1, B2, B1, B2, P1, P2, BI, B2, - - -, I1, I2. For example, referring to FIG. 6, F1, F2, F3, - - -, F25 in the upper part show a regular frame system are frames restored with the original motion vectors MV, and the F2', F4', - - -, F50' with a "prime" in the lower part inserted between original frames are the newly added frames. That is, as a new motion vector MV' is used in production of F2', F4', - - -, F50', the frames have a linearity in view of motion. In this instance, in response to read/write signals and vertical/horizontal synchronizing signals, the FIFO memory 45-4 writes pictures having compensated in two times according to a write clock(13.5 MHz in case of PAL) and, then, reads according to a clock two times of the write clock(27 MHz in case of PAL). Therefore, in effect, it is the same with a case two lines of motion compensated pictures within one horizontal frequency are displayed. If two times of frames are restored using original motion vectors MVs and new motion vectors MVs', written on the FIFO memory 45-4 at a regular clock, read from the FIFO memory 45-4 at a speed two time faster than a speed in the writing, a frame rate provided at the end is 50 (in the case of PAL), though a total frame rate is 25(in the case of PAL), eliminating the flicker, which is the most effective in the case of PAL, and can be also applicable to NTSC.

If the frame rate of a received data is of a film mode(24 frames per one second), the frame rate should be converted into a frame rate of NTSC or PAL, which is designed to be carried out by the display part 47. To do this, the motion compensating circuit provides a decoded motion vector selected_MV to the frame rate converting part 47-1 in the display part 47. In this instance, the motion vector selected_MV may be the motion vector MV provided to the motion vector reproducing part 45-1 or the motion vector MV or MV+MV' from the motion vector reproducing part 45-1. And, the frame rate converting part 47-1 uses encoded information in the frame or field f from the FIFO 45-4 in determining the video signal being an original broadcasting signal or a film signal and determines conversion of a frame rate of the video signal according to a result of the determination. That is, upon reception of an MPEG decoded frame or field f, the video signal determining part 51 in the frame rate converting part 47-1 examines the repeat signal first_field_repeat stored in a coding extension part Picture_coding extension in the MPEG syntax in encoding in determining a frame rate conversion; if the first_field_repeat signal is set at "0", the MPEG decoded video signal f is, determined to be a general broadcasting signal, directly provided to the buffer 54 without subjecting to a frame rate conversion and displayed through the display controlling part 47-2, and if the first_field_repeat signal is set at "1", the MPEG decoded video signal f is, determined to be a film signal, subjected to a frame rate conversion into a frame rate of a general broadcasting signal, for example, of NTSC or PAL, and provided to the display controlling part 47-2. That is, if the MPEG decoded video signal f is determined to be a film signal in the video signal determining part 51, the frame compensating part 53 newly produces frames of which motion components are compensated from restored field f or frame in conformity with a TV broadcasting signal to be applied. In this instance, the motion vector reconciling part 52 provides a reconciled motion vector NEW_MV to the frame compensating part 53 using a motion vector selected_MV from the motion compensating circuit. The reconciled motion vector NEW_MV may be, an average of two adjacent motion vectors, or an average of two motion vectors each of which is weighted different form each other, or the present motion vector itself. The frame compensating part 53 uses the new motion vector NEW_MV from the motion reconciling part 52 in producing a new frame. That is, the frame compensating part 53 produces a new field or frame which has a smoother motion component by means of a received video signal and the motion vector NEW_MV re-calculated through the motion vector reconciling part 52.

Figure 7:
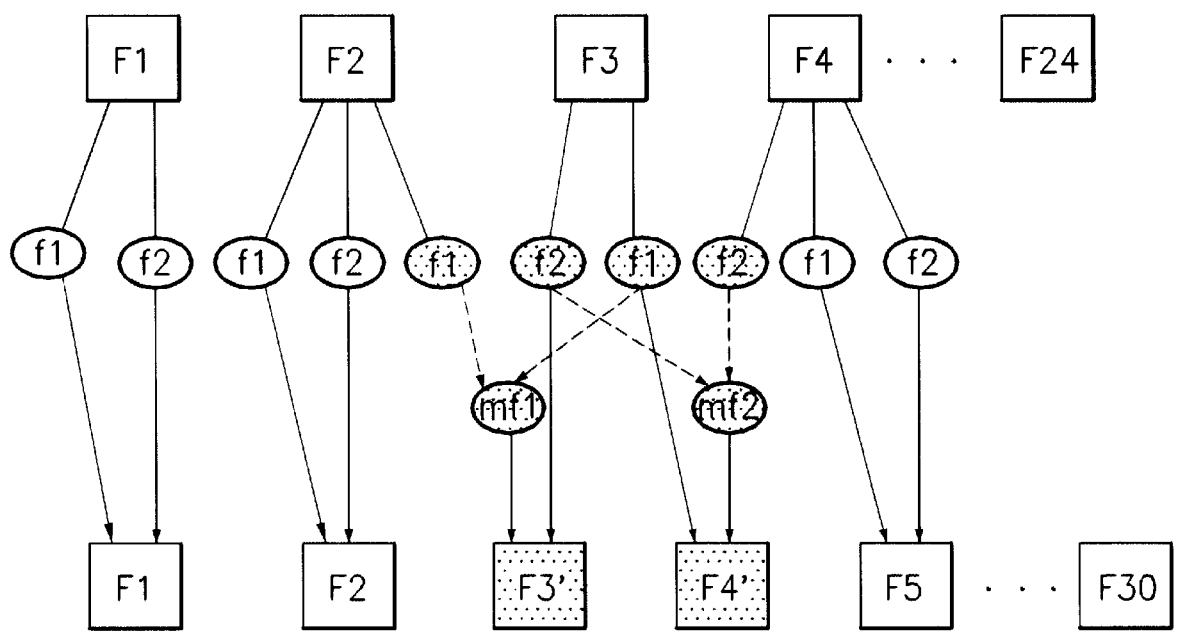

FIG. 7 is a diagrammatic illustration of the aforementioned process of producing new frames or fields, wherein an example of a frame rate conversion to a frame rate of an NTSC broadcasting signal by producing a new field between frames and producing a new frame using the newly produced field, is shown.

Referring to FIG. 7, a top field f1 and a bottom field f2 of a first frame F1 in a film signal compose a frame F1 of the NTSC broadcasting signal, and, alikely, the top field f1 and the bottom field f2 of a second frame F2 compose a frame F2 of the same. The top field f1 and the bottom field f2 in each frame are provided from the FIFO 45-4 in the motion compensating circuit. And, the top field f1 of the second frame F2 and the top field f1 of a third frame F3 compose a new top field Mf1, and the bottom field f2 of the third frame F3 and the bottom field f2 of a fourth frame F4 compose a new bottom field Mf2. Note that the new top field Mf1 and the new bottom field Mf2 are not mere repetition of fields, but fields of which motion components are compensated by the motion vectors NEW_MV reconciled in the motion vector reconciling part 52. The newly produced top field Mf1 and bottom field Mf2 are used in producing new frames F3' and F4'. That is, the newly produced top field Mf1 and the bottom field f2 of the third frame F3 in the film signal are used in producing a motion compensated new frame F3', and the newly produced bottom field Mf2 and the bottom field f2 of a fourth frame F4 in the film signal are used in producing a motion component compensated new frame F4'. And, the top field f1 and the bottom field f2 of the fourth frame F4 in the film signal compose a video frame F5 intended to display. Upon repetition of the aforementioned process up to 24th frame F24 in the film signal, the video frame can have a frame rate of 30. By producing new frames employing new fields Mf1 and Mf2 obtained through interpolation of motion vector components between fields in adjacent frames, the blurring can be prevented, allowing to obtain a smoother video signal.

Figure 8:
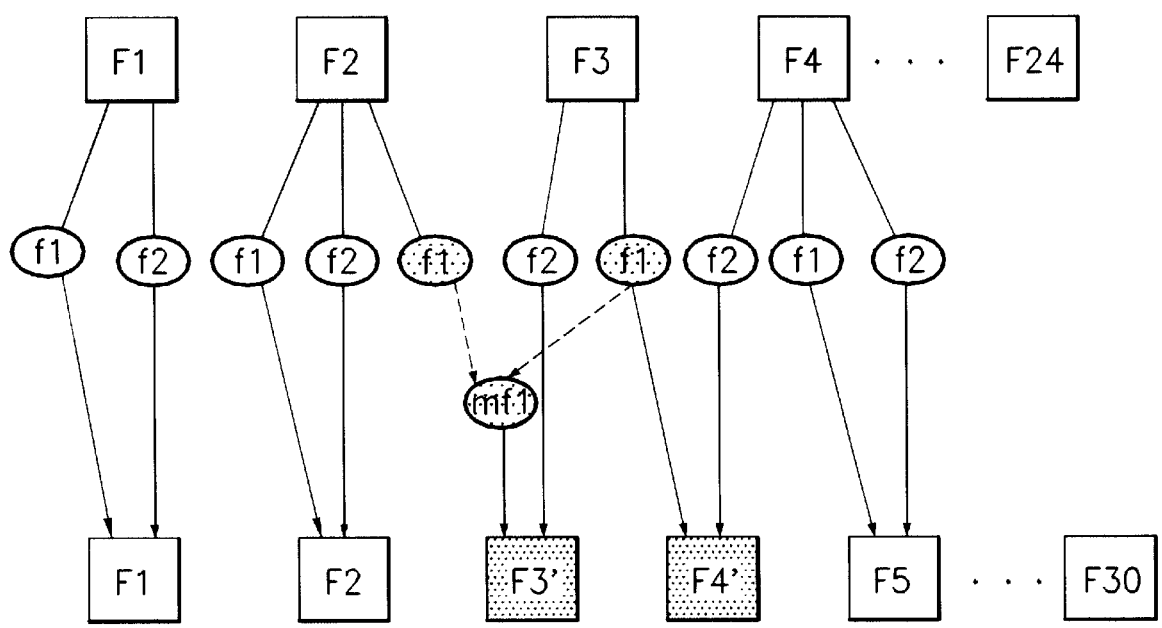

In the meantime, FIG. 8 is a diagrammatic illustration of another embodiment of a process for producing new frames or fields, wherein the top fields f1 of the second frame F2 and the third frame F3 in the film signal are applied of the motion vector NEW_Mv reconciled in the motion vector reconciling part 52 to produce a motion compensated new top field Mf1, and the newly produced top field Mf1 and the top field f1 of the third frame F3 in the film signal are used in producing a motion component compensated new frame F3'. And, alike the background art, the new frame F4' is produced using the top field f1 of the third frame F3 and the bottom field f2 of the fourth frame F4 adjacent to the third frame F3.

Figure 9:
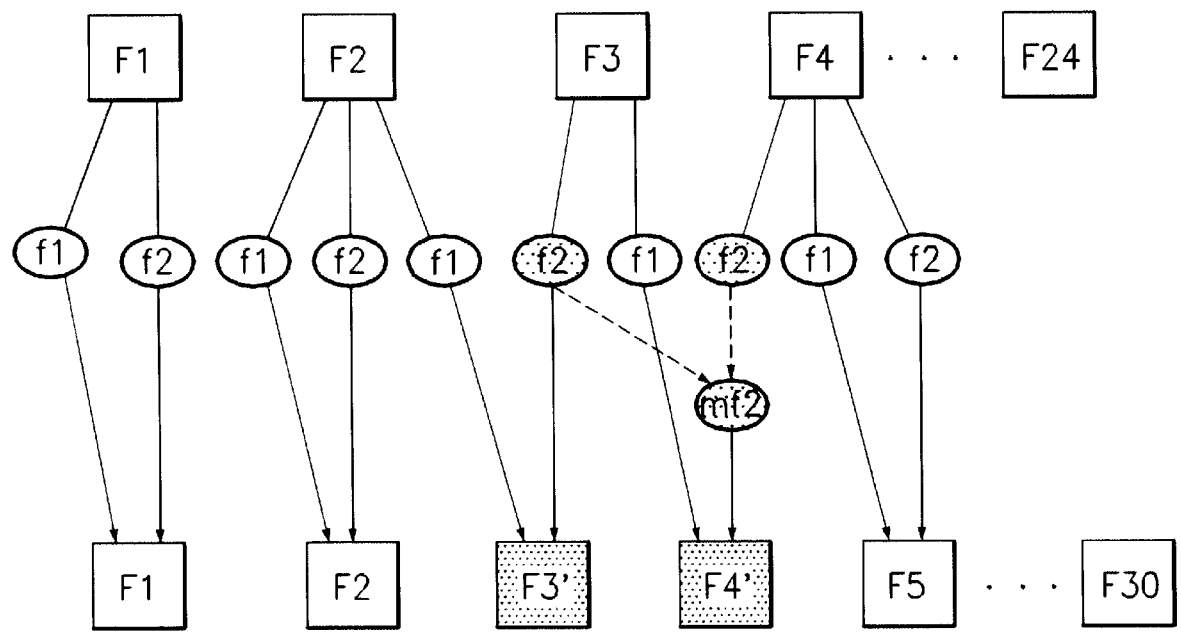

And, FIG. 9 is a diagrammatic illustration of further embodiment of a process for producing new frames or fields, wherein, alike the background art, a new frame F3' is produced using the top field f1 of the second frame F2 and the bottom field f2 of the third frame F3. And, a new frame F4' is produced by applying the motion vector NEW_MV reconciled in the motion vector reconciling part 52 to bottom fields f2 of the third frame F3 and the fourth frame F4 in the film signal to produce a new bottom field Mf2 and using the produced bottom field Mf2 and the top field f1 of the third frame F3 in the film signal. That is, in FIGS. 8 and 9 too, the newly produced fields Mf1 and Mf2 are fields of which motion components are compensated by the motion vector NEW_MV reconciled in the motion vector reconciling part 52. Thus, by producing new fields Mf1 and Mf2, or Mf1, or Mf2 through interpolation of motion vector components between the present frame F3 and the adjacent frame F2 or F4 and producing new frames F3' and F4' using the newly produced fields, the blurring of motion vector components can be prevented, which is occurred when a film signal is displayed, with the film signal being applied to a general broadcasting signal, such as NTSC and PAL.

In the meantime, a slow motion may also be implemented, not by mere repetition of fields or frames, but by producing motion component compensated fields or frames. That is, when a slow motion mode is selected, a motion vector received at that time are used in producing new motion vectors, and the new motion vectors are used in producing N additional frames which are motion component compensated. The new motion vector may be obtained by averaging two adjacent motion vectors, but the new motion vector may be obtained more effectively by weighting motion vectors differently from one another for application to newly added frames. For example, if 5 frames are to be added between the second frame F2 and the third frame F3, a motion vector to be applied to a first newly added frame is produced to be closer to a motion vector of the F2 frame, a motion vector to be applied to a third newly added frame is produced to be closer to an average of the motion vectors of the F2 and F3 frames, and a motion vector to be applied to a fifth newly added frame is produced to be closer to a motion vector of the F3 frame. When frames additionally produced thus are inserted between frames and a new array of frames are read at a regular speed, a slow motion can be displayed in real time. And, as each of the additional frames has a different motion vector, the slow motion appears smooth. The production of the motion compensated frames in real time allows to dispense with a separate memory for the frames produced additionally.

Because a frame rate is converted using additionally produced frames of which motion components are compensated together with encoded frames in converting a received source frame rate to a target frame rate, the device and method for converting a frame rate of the present invention can make motions of a video displayed in a converted rate smooth and can provide a clear picture quality. And, the display of a video signal to horizontal/vertical synchronizing signals two time faster than original frequencies after producing a separate frame of which motion component is compensated between frames in a digital TV of PAL or NTSC system can eliminate flicker. And, the frame rate conversion by producing separate frames of which motion components are compensated in conversion of a video of a film rate to a video of PAL or NTSC system frame rate can prevent blurring which is occurred at portions where there are motions, providing smoother and clearer video. The additional N frames inserted between adjacent frames, of which motion components are compensated different from one another, and the real time processing in displaying a slow motion can dispense with any separate memory and can display the slow motion smoother.

It will be apparent to those skilled in the art that various modifications and variations can be made in the device and method for converting a frame rate of the present invention without departing from the spirit or scope of the invention. Thus, it is intended that the present invention cover the modifications and variations of this invention provided they come within the scope of the appended claims and their equivalents.

What is claimed is:

1. A device for converting a frame rate in an MPEG decoding device which receives and restores a video bitstream through variable length decoding, inverse scanning, inverse quantizing and IDCT and adds to a motion compensated data using a stored prior picture and a motion vector provided from a transmitter side for providing a field or a frame before compression, the device comprising:

motion vector producing means for producing a new motion vector using the motion vector;

frame producing means for applying the motion vector newly produced in the motion vector producing means to the field or frame for producing a new field or frame; and, display means for adding the new frame having a motion component compensated in the frame producing means to the MPEG decoded frame.

2. A device as claimed in claim 1, wherein the display means adds the new frame having a motion component compensated in the frame producing means between every adjacent frames in a series of the MPEG decoded frames and displaying on a screen to horizontal/vertical synchronizing signals of two times.

3. A device as claimed in claim 1, wherein the display means adds the new frame having a motion component compensated in the frame producing means between preset frames only in a series of the MPEG decoded frames and displaying on a screen at a regular clock frequency.

4. A device as claimed in claim 1, wherein the display means adds N new frames produced additionally in the frame producing means between frames in a series of the MPEG decoded frames and displaying on a screen at a regular clock frequency.

5. A device as claimed in claim 1, wherein the motion vector producing means averages adjacent two motion vectors for obtaining a new motion vector.

6. A device as claimed in claim 1, wherein the motion vector producing means weights respective motion vectors in calculating a new motion vector.

7. A device for converting a frame rate in an MPEG decoding device, the MPEG decoding device comprising a data restoring part for receiving and restoring a video bitstream through variable decoding, inverse scanning, inverse quantizing and IDCT, a memory for storage of prior pictures and a display controlling part for re-arranging a received data according to an order of display, the device comprising:

motion vector reproducing means for using a motion vector MV transmitted from a transmitter side in producing a new motion vector MV', multiplexing MV+MV' the new motion vector with existing motion vectors in terms of time;

a motion compensating and frame producing means for applying the motion vector MV+MV' from the motion vector reproducing means to prior pictures stored in the frame memory respectively and adding to data from the data restoring part respectively; and, storage means for writing the data from the motion compensating and frame producing means at a regular clock frequency, reading at a clock frequency two times faster and forwarding to the display controlling part.

8. A device as claimed in claim 7, wherein the motion vector reproducing means obtains an average of adjacent two motion vectors and multiplexes the average with prior motion vectors in terms of time.

9. A device as claimed in claim 7, wherein the motion vector reproducing means weights each of the motion vectors in obtaining a new motion vector and multiplexes the new motion vector with prior motion vectors in terms of time.

10. A device as claimed in claim 7, wherein the storage means is an FIFO memory.

11. A device for converting a frame rate in an MPEG decoding device which receives and restores a video bitstream through variable length decoding, inverse scanning, inverse quantizing and IDCT and adds to a motion compensated data using a stored prior picture and a motion vector provided from a transmitter side for providing a field or a frame before compression, the device comprising:

frame rate converting means for determining whether the MPEG decoded video signal is an existing broadcasting signal or a film mode signal according to a digital TV signal standard and converting a frame rate of the MPEG decoded video signal using a motion vector transmitted from a transmitter side if the MPEG decoded video signal is the film mode signal for application as a broadcasting signal; and, display controlling means for displaying the video signal from the frame rate converting means on a TV screen.

12. A device as claimed in claim 11, wherein the frame rate converting means includes, a video signal determining part for determining whether the MPEG decoded signal is an original broadcasting signal or the film mode signal according to a digital TV signal standard from information encoded in the MPEG decoded video signal, a motion information reconciling part for calculating a new motion vector using the motion vector from the MPEG decoding device if the MPEG decoded signal is determined to be the film mode signal in the video signal determining part, a frame compensating part for applying the motion vector reconciled in the motion information reconciling part to the frame from the video signal determining part for producing a motion compensated new frame in conversion of a frame rate, and a buffer for temporary storage of the video signal from the frame compensating part or the video signal determining part.

13. A device as claimed in claim 11, wherein the motion information reconciling part averages adjacent two motion vectors for use as a reconciled motion vector.

14. A device as claimed in claim 11, wherein the motion information reconciling part weights motion vectors respectively in producing reconciled motion vectors.

15. A method for converting a frame rate in an MPEG decoding method, the MPEG decoding method including the steps of receiving and restoring a video bitstream through variable length decoding, inverse scanning, inverse quantizing and IDCT and adding to a motion compensated data using a stored prior picture and a motion vector provided from a transmitter side for providing a field or a frame before compression, the method comprising:

(1) a motion information producing step for producing a new motion vector using the motion vector;

(2) a frame producing step for applying the new motion vector produced in the (1) motion information producing step to the field or frame for producing a motion component compensated new field or frame; and, (3) a display step for adding the motion component compensated new frame in the (2) frame producing step to the MPEG decoded frame for display on a screen in a converted frame rate.

16. A method as claimed in claim 15, wherein the (3) display step includes the steps of, adding the new frame having motion components compensated in the (2) frame producing step between every adjacent frames in a series of the MPEG decoded frames, and displaying at two times of clock frequency.

17. A method as claimed in claim 15, wherein the (3) display step includes the steps of, adding the new frame having motion components compensated in the (2) frame producing step between preset frames only in a series of the MPEG decoded frames, and displaying at a regular clock frequency.

18. A method as claimed in claim 17, wherein the (3) display step includes the steps of, producing a motion component compensated new field from fields of related adjacent frames, and producing a motion component compensated new frame from the produced new field and a remaining field of the present frame.

19. A method as claimed in claim 18, wherein the step of producing a motion component compensated new field includes the steps of, applying the produced new motion vector to a top field of a frame of a prior picture and a top field of a frame of the present picture, for producing a new top field of which motion component is compensated, and using the top field produced in the above step and a bottom field of the present frame for producing a motion component compensated new frame.

20. A method as claimed in claim 18, wherein the step of producing a motion component compensated new field includes the steps of, applying the produced new motion information to a bottom field of a frame of the present picture and a bottom field of the next frame for producing a new bottom field of which motion component is compensated, and using the bottom field produced newly in the above step and the top field of the present frame in producing a new frame of which motion component is compensated.

21. A method as claimed in claim 18, wherein the step of producing a motion component compensated new field includes the steps of, applying the newly produced motion information to the top field of a frame of a prior picture and a top field of a frame of the present picture in producing a new top field of which motion component is compensated, applying the newly produced motion information to a bottom field of a frame of the present picture and a bottom field of the next frame in producing a new bottom field of which motion component is compensated, using the top field newly produced in the above step and the bottom field of the present frame in producing a new frame of which motion component is compensated, and using the bottom field newly produced in the above step and the top field of the present frame in producing a new frame of which motion component is compensated.

22. A method as claimed in claim 15, wherein the (3) display step includes the steps of, adding N(N is a natural number) new frames produced additionally in the (2) frame producing step between frames in a series of the MPEG decoded frames, and displaying at a regular clock frequency.

* * * * *